Patented Feb. 14, 1928.

1,659,358

UNITED STATES PATENT OFFICE.

IVAN GUBELMANN, HENRY J. WEILAND, AND OTTO STALLMANN, OF SOUTH MILWAUKEE, WISCONSIN, ASSIGNORS TO THE NEWPORT COMPANY, OF CARROLLVILLE, WISCONSIN, A CORPORATION OF DELAWARE.

3'-5'-DINITRO-4'-HYDROXY-ORTHO-BENZOYL-BENZOIC ACID AND PROCESS OF MAKING THE SAME.

No Drawing.   Application filed November 29, 1926.   Serial No. 151,591.

This invention relates to 3'-5'-dinitro-4'-hydroxy-ortho-benzoyl-benzoic acid and a process of making the same.

We have discovered that 4'-hydroxy-ortho-benzoyl-benzoic acid can be nitrated with suitable nitrating agents, such as nitric acid, a mixture of sulphuric and nitric acids, nitrates and the like, to the 3'-5'dinitro-4'-hydroxy-ortho-benzoyl-benzoic acid, having most probably the following structure:

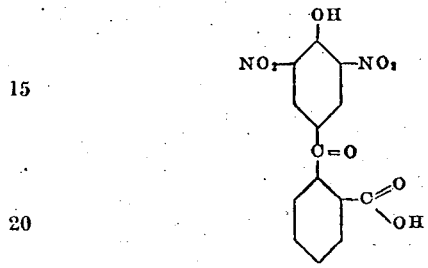

The nitration can be carried out at various temperatures, in various solvents and in various strengths of acids. The nitration proceeds in two steps, the first step giving the mono-nitro derivative, which has already been described in our co-pending application, Serial No. 119,247, filed June 28, 1926. The mono-nitro derivative, produced either according to the present process, or according to the process in the above referred to application, is upon further addition of nitric acid or other nitrating agent, transformed into the dinitro derivative. The general reaction can most probably be expressed by the following chemical equations:

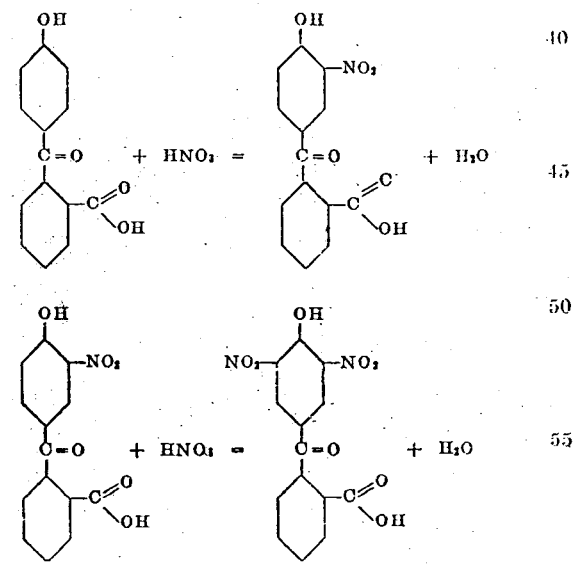

The 3'-5'-dinitro-4'-hydroxy-o-benzoyl-benzoic acid is a pale yellow crystalline powder, somewhat soluble in cold water and fairly soluble in hot water. It is easily soluble in alcohol, but is almost insoluble in dilute mineral acid. It dissolves readily in diluted caustic and ammonia solutions. The di-sodium salt in solution can not be salted out of its solution by the addition of common salt or caustic soda. Water solutions of the compound dye wool a bright yellow shade. By recrystallization from diluted alcohol, a melting point of 198–200° C. can be obtained on the purified compound.

Without limiting our invention to any particular procedure, the following example, in which parts by weight are given, illustrates the application of our invention in the preferred form.

243 parts of para-hydroxy-ortho-benzoyl-benzoic acid are dissolved in 484 parts of sulphuric mono-hydrate at a temperature of about 25° C. This solution is cooled to 18° C. and 800 parts of a mixture analyzing 17% nitric acid and 87% sulphuric acid is run in slowly at that temperature. After all the mixed acid has been run in, the temperature of 18° C. is maintained for an additional hour. The nitration mass is then diluted by pouring it into a mixture prepared from 1000 parts of ice and 2000 parts of water and stirred until homogeneous. The precipitated dinitro body is then filtered off and washed on a filter with about 1000 parts of cold water until free of mineral acid. The washed product is then dried at 100° C. The yield is 316 parts, corresponding to 95% of theory, having a melting point on the crude of 193–195° C. Upon recrystallization of the crude product from diluted alcohol, the melting point of the purified dinitro-hydroxy-ortho-benzoyl-benzoic acid is 198–200° C.

It will be understood that instead of starting with the para'-hydroxy-ortho-benzoyl-benzoic acid, the starting material may be the mono-nitro body, 3'-nitro-4'-hydroxy-ortho-benzoyl-benzoic acid, such as described in the application referred to.

Obviously, the general method of nitration may be varied as to temperature, concentration of acids and the like without departing from the spirit of this invention and we do not desire limiting the patent granted hereon otherwise than as necessitated by the prior art.

We claim as our invention:

1. As a new article of manufacture, 3'-5'-dinitro-4'-hydroxy-ortho-benzoyl-benzoic acid, having most probably the following formula:

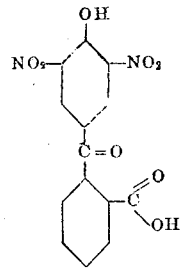

2. The process of preparing 3'-5'-dinitro-4'-hydroxy-ortho-benzoyl-benzoic acid, which comprises treating 4'-hydroxy-ortho-benzoyl-benzoic acid dissolved in sulphuric acid monohydrate with a nitrating mixture analyzing approximately 17 per cent nitric acid and 87 per cent sulphuric acid at a relatively low temperature, diluting the nitration mass to precipitate the dinitro body and isolating said dinitro body.

In testimony whereof we have hereunto subscribed our names.

IVAN GUBELMANN.
HENRY J. WEILAND.
OTTO STALLMANN.